June 6, 1972            W. R. ADAMS            3,667,984

COATED POROUS STRUCTURES AND METHOD FOR FORMING THEM

Original Filed Aug. 16, 1968

INVENTOR.
WHITNEY R. ADAMS
BY
ATTORNEY

United States Patent Office 3,667,984
Patented June 6, 1972

3,667,984
COATED POROUS STRUCTURES AND METHOD FOR FORMING THEM
Whitney R. Adams, Wilmington, Del., assignor to Scott Paper Company, Delaware County, Pa.
Application Aug. 16, 1968, Ser. No. 756,344, which is a continuation-in-part of application Ser. No. 491,612, Sept. 30, 1965. Divided and this application July 14, 1969, Ser. No. 870,692
Int. Cl. B44d 1/094
U.S. Cl. 117—21
11 Claims

ABSTRACT OF THE DISCLOSURE

Porous structures such as cellular honeycombs and reticulated foams coated wtih organic resins of the thermoplastic or thermosetting type, and structures in which the internal material comprising the structure being coated is removed as by leaching or hydrolysis to leave only the coating material as an integral structure. Processes for forming the above structures in which the surface of the porous structure is treated to temporarily attach a coating material in the form of powder, as by wetting the surface with a liquid or an adhesive and dusting the surface with the powder, heated to melt the powder into a smooth contiguous coating, and, in some instances, subjected to hydrolysis to remove the material comprising the original structure being coated so as to leave only the structure formed by the coating material.

CROSS-REFERENCE TO RELATED APPLICATIONS

This application is a division of U.S. patent application Ser. No. 756,344, filed Aug. 16, 1968, which is a continuation-in-part of U.S. patent applications, Ser. No. 365,809, filed May 7, 1964; Ser. No. 365,819, filed May 7, 1964; and Ser. No. 491,612, filed Sept. 30, 1965; all of which were abandoned after the filing of said application.

BACKGROUND OF THE INVENTION

(1) Field of the invention

This invention relates to coated porous structures and a method for forming them and, more particularly, to porous structures coated with organic resins and a new and novel method for applying such coatings to such structures.

(2) Description of the prior art

During recent years, there has been an increasing use of porous materials in a variety of areas such as the chemical field and the aerospace field. Among the applications for which these materials have been employed have been uses in the area of filtering of various media including gases as well as liquids. These novel materials have also been sought after for use as structural materials where a high strength-to-weight ratio is required.

For these purposes and to attempt to fulfill these needs, a large number of conventional materials have been employed such as intricately fabricated metal foils and honeycomb structures comprised of other materials as well as some of the more recently developed porous structures such as the reticulated polyurethane foams and, in some cases, reticulated polyvinyl chloride foams. While these structures perform satisfactorily in a limited number of applications where conditions are sufficiently mild for their use, they cannot be employed under more severe conditions of temperature, pressure, applied weight load or chemical reactivity. Thus, it is apparent that structures characterized by the above descrpition often have insufficient strength for many uses at normal temperatures, and furthermore, are very lacking in the required strength for many uses at elevated temperatures, that is, on the order of 200° F. and higher.

At present, it is well-known to construct a variety of open-celled, reticulated network-type structures from any one of several organic resin materials, such as polyurethane foam. Polyvinylchloride foams of acceptable permeability have recently been obtained in reticulated form by novel explosion techniques. In addition, there is a well-developed body of knowledge concerning the formation of many other types of three-dimensional cellular structures, such as honeycombs of various design, and similarly, many other cellular geometric structures. These latter structures can be formed from a variety of materials including glass fiber sheets, paper and different metal foils. To form such honeycomb structures by welding or other metal fabrication techniques is extremely expensive and often impossible where a cell of a small cross-section is desired.

By far one of the most inexpensive cellular structures known seems to be reticulated polyurethane foam which can be produced in relatively large sizes and in practically any shape and the pore size of which can be varied over a wide range with a fair degree of control. Polyurethane structures suffer from poor chemical resistance to acid and alkali attack and are subject to considerable swelling when in contact with the most organic solvents, while polyvinylchloride foams allow very little variation and control of pore size.

The coating of such structures with organic resins to improve their characteristics has been considered by many and is not a new idea. However, this feat has not heretofore been successfully accomplished. For example, although there has been extensive work done in the coating of simple structural objects formed from high heat retaining materials such as metal by means of treatment in a fluidized bed wherein the heated article is immersed in a fluidized bed of heated organic resin powder and received a smooth contiguous coating over its surface obviously, for a variety of reasons, such as poor heat transmission and heat resistance, many structures cannot be coated by such a process. For instance, depending upon the resin employed as well as the characteristics of the material being coated, such a process might be impossible of performance since the basic structure would disintegrate or decompose at a temperature below the fusion temperature of the organic resin. Another defect of this type of proces sis that it is incapable of providing a coating on the interior surfaces of porous structures and especially those which have a large number of small cells and a relatively thick cross-section. Even if a coating could be placed on the interior of the structure, it would not be uniform since the exterior would be unavoidably more exposed to the resin during the coating process and, therefore, would receive a thicker or heavier coating.

Other prior-art processes for coating articles of various kinds with organic resins are also known. For example, a molten polyethylene may be used to coat a preheated article. However, the viscosity of the molten mass is so high (at the temperature ranges at which polyethylene will not decompose) that it is particularly wasteful to use the dipping method in producing polyethylene-covered articles. Also, surprisingly, if reticulated polyurethane is immersed in molten polyethylene, the whole structure becomes clogged and filled with the polyethylene. Similar problems are prevalent with other organic resins also. Coating of structures by the electrostatic coating system is not possible unless the structure is conductive. According to this method, only relatively flat metal sheets can be coated, and only very thin coatings can be applied.

Other materials having more desiable physical and chemical characteristics have been considered as such cellular structures. However, most polyolefin foams such as polyethylene and polypropylene foams are close-celled; i.e., there is little if any intercommunication. This phenomenon, therefore, prevents the close-celled polyolefin foams from being reticulated to remove the cell walls as by chemical action or explosion.

It is also well known that polyolefins are extremely resistant to acid or alkali attack and do not swell in most solvents. Because of this resistance, reticulated polyolefin structures have always been a long-sought goal in acid- or alkali-filtering applications. Even though the polyolefin foams have been made and even if they could be reticulated (presently believed to be impossible), poor size control of the polyolefin foams in the range desired in filtering operations is practically nonexistent when compared to the pore size control possible with polyurethane foams.

Various processes have been used to obtain suitable filtering devices made of polyethylene. For example, polyethylene shreds or floss have been made into a filter element. Other processes have been directed to sintering polyethylene particles into a cohesive filter. However, the structural form of this filter element has not been very desirable from the standpoint of physical properties and uniformity.

SUMMARY OF THE INVENTION

The present invention provides new high strength-to-weight materials having greater resistance to high temperature and chemical reactivity. The structures of the invention are generally of a porous nature having a plurality of open cells which may be of substantially any desired configuration and the material forming this basic structure is coated with a relatively thick coating of an organic resin, which may be either thermoplastic or thermosetting. This coating then assumes the basic configuration of the first structure and, furthermore, is most cases provides for most of the strength of the final structure.

It will be readily apparent to those concerned with new materials and their application that the method of the present invention provides a new and novel material or materials which are relatively low in cost and can be employed successfully in a variety of applications where prior materials failed, demonstrating a performance which, in many cases, is superior to that of the more expensive structures previously employed. Broadly characterized, this material is a porous structure having a plurality of cells, all of which are open to the atmosphere, comprised largely of one or more layers of an organic resin, which may be either thermoplastic or thermosetting and which is a coating upon a skeletal structure formed by a basic material easily fabricated into the desired configuration. The materials of the invention can be employed in many processes wherein it is desired to have a three-dimensional cellular or porous structure for use as a structural member or filtering matrix under chemically reactive conditions and slightly elevated temperatures. Thus, these structures may now be used to perform tasks previously possible only by the use of expensive and painstakingly fabricated metallic or glass structures, or in certain applications, porous ceramic bodies.

The invention also provides structures of the above description which include additives such as pigments, fillers, and strengthening fibers in the layer of organic resin coating material. The variations and advantages attributed by this feature will be apparent subsequently. In addition, the invention includes such structures having various substances such as different organic and inorganic compounds in the form of grains, flakes or fibers attached or bonded to the surface of the structure. These substances impart capabilities to the structure in the form of surface effects which influence highly the fluid flow through the structure, the ability of the structure to filter certain media, ion exchange or other chemical properties, and may in certain instances have a considerable effect on the over-all strength of the structure.

Therefore, it is an object of the present invention to provide high strength cellular or porous structures for use under a variety of conditions.

It is a further object of the present invention to provide relatively high strength structures for use under a variety of conditions from relatively low strength structures and structures which have already low fusion or decomposition temperatures and which may be originally constructed by inexpensive and uncomplicated fabrication methods.

It is an additional object of the invention to provide such structures having anisotropic properties.

It is a further object of the invention to provide a porous structure having open intercommunicating passages or cells, the material forming which has an interior of a basic structural material easily fabricated into the desired configuration and an exterior of an organic resin coating material and a pigment, filler, and/or fibrous material included in and/or on the surface of the organic resin coating.

It is a further object of the invention to provide such structures having isotropic properties.

It is a still further object of the invention to provide a structure comprised of a matrix of interconnecting strands and nexus forming reticulated randomly oriented and interconnecting cells, which strands are comprised of polyurethanes and are coated with an organic resin, and a pigment, filler and/or fibrous material included in and/or on the surface of the organic resin coating.

Further in accordance with the invention, novel structures having the essential characteristics of a reticulated polyolefin foam can be produced having the desirable pore size features of polyurethane polymers and the chemical resistance of polyolefins.

Even though the cells are randomly oriented and thus anisotropic to each other, the whole structure behaves something like an isotropic body. This property of the foam is very desirable as the pressure-drop characteristics are superior to some of the prior-art filtering pads. Thus, structures made of the novel composites are especially desirable for acid- and alkali-filtering applications because of the uniform pore size and more isotropic nature when compared to the anisotropic filtering and contacting means such as polyethylene mats.

Moreover, other characteristics of these novel composites show improved properties in the applied stress-strain relationship when compared to regular polyurethane foams. For example, the energy required to compress the novel composites is significantly higher for polyethylene-coated polyurethane than uncoated polyurethane. This property finds ready application in self-supporting filters.

Equally surprising results are obtained when the novel composites are heat-formed into various shapes desired. By heating the polyethylene-polyurethane reticulated structure and then holding this structure in the desired form and cooling it, a permanently set structure is obtained which will not spring back to the previous shape as polyurethane alone will do. This property of the novel structures enables production of various shape-retaining forms of the structure in hard-to-conform contours.

Further, bonding of the novel structure to various other materials is very easy because melted polyethylene exhibits good adhesion. For example, composite filters of varying pore sizes can be prepared by melting the polyethylene on the surface of one novel structure, and joining it to another of the present structures having less pores per lineal inch. Needless to say, various composites may be prepared in this manner. Similarly, the novel structure may be bonded to any roughened surface possessing sufficient affinity for molten polyethylene.

Novel composites of the present invention are useful in applications such as heating plant filters, humidifier and evaporative cooler pads (in this connection surface modifiers such as glass, asbestos, feldspar and pumice may be used). For example, using polyethylene as a substrate and an adhesive to deposit on it different particulate materials or powders, such as those mentioned above, and others such as alumina, carborundum, etc., novel surface-modified structures may be obtained.

Alternatively, using polyethylene as a carrier for depositing polyethylene on the polyurethane substrate gives novel and different structures of the same or different abrasive materials, pigments such as $TiO_2$, and fibers. Other uses of the novel structures include scrubber pads (polyethylene having incorporated abrasive materials or surface modified), carburetor air filters in general, and also those using "blow-up" gases, cushions, mattresses, upholstery, etc.

It has now been found that many filtering, shaping and other problems encountered with polyurethanes have also been solved by essentially-reticulated polyolefin structures produced by enveloping reticulated polymeric polyurethane structures with a polyolefin envelope resembling the reticulated polyurethane structure. Other products resulting from the novel structures are densified materials having good porosity and permeability, yet possessing great structural strength. Densification of from 2 to 15 times the original volume has been achieved.

An additional object and advantage of the present invention is to provide a method for coating porous structures with organic resins in a simple manner and which method enables a large number and variety of new and different porous structures to be coated than has heretofore been possible.

In order to achieve this advantage, the method of the invention provides for temporarily attaching particulate organic resin coating material to the entire surface of the porous structure to be coated including all of the exposed surface within the innermost portions of such a structure. Then, in accordance with the method of the invention, the particulate material is fused into a contiguous uniform coating or layer over the entire surface of the porous structure at a temperature lower than the disintegration temperature of the basic structure. After the resin coating is cured as in the case of a thermosetting resin, it provides a structure in itself which is, in most cases, many times stronger than the original basic structure.

The invention also includes porous structures made essentially of certain organic resins which are susceptible of being used for coating in accordance with the method of the invention. The material forming the original structure which is coated has been removed from these products so that substantially only the desired material comprising the coating remains.

Such structures are formed by the method of the invention by subjecting the coated structure to a strong hydrolyzing action, such as a solution, the exact composition of which depends upon the chemical composition of the material forming the structure which is coated and which is to be removed by hydrolysis. Where this structure is polyurethane foam, a strong acid or alkali solution, preferably at elevated temperatures and high concentration, has been found advantageous.

Additional objects and advantages of the invention will be apparent from the following detailed description thereof, taken in conjunction with the following drawings in which:

DESCRIPTION OF THE PREFERRED EMBODIMENTS

In general, the method of the present invention involves temporarily attaching particulate organic resin coating material upon the surface of a porous structure formed from material having a given fusion temperature and having open intercommunicating cells or passages. One way of accomplishing this is to wet the structure with a binding liquid and to deposit particulate resin coating material thereon as by dusting techniques, for example. The coating material has a fusion temperature, when in the uncured condition, which is below the fusion temperature of the material comprising the porous structure. The article coated thereby is then heated to a temperature which is above the fusion temperature of the particulate coating material and which is below the decomposition temperature and fusion temperature of the material forming the original porous structure until the coating material is fused over the surface of the structure into a substantially contiguous coating on its surface. This may be performed in many ways such as by inserting the coated structure into an oven or a heating zone using infrared, radiant or convection heating. The coating material is maintained at the above or an increased temperature until the material is cured into a rigid, self-supporting condition. This results in an article having a shape substantially the same as the shape of a basic structure coated originally but formed of a material, the interior of which is the basic structure, and the exterior of which is formed of a different material having more desirable physical characteristics and much greater strength. The wetting, dusting and heating steps may be repeated, if needed, to increase the coating thickness.

Figure 1:
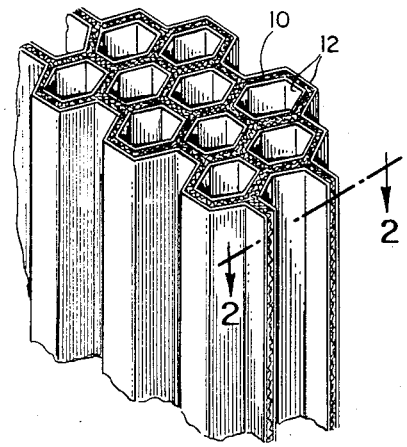
FIGS. 1 and 3 are enlarged views in perspective of a variety of porous structures having open intercommunicating cells, which structures are typical of those which may be formed in accordance with the method of the invention.
Figure 3:
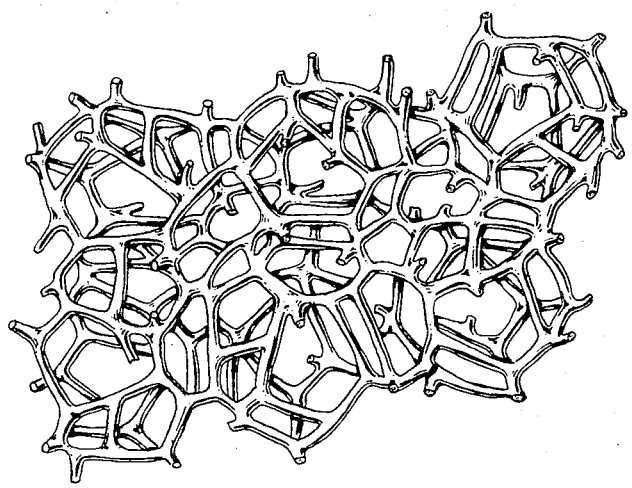

Initially, it should be understood that a large variety of structures may be coated by the method of the invention. Several examples of typical structures which may be successfully coated by means of the method of the invention are shown in FIGS. 1 and 3. The invention is very useful in coating structures of a porous nature having open interconnecting cells or passages, some of which may be extremely long, relative to the cross-sectional area of the cells, that is, on the order of 24 inches or longer for a cell size of $\frac{1}{16}$ square inch and less, and which cannot be satisfactorily coated by previously known methods.

Among the types of materials which can be employed as substrates and successfully be coated in accordance with the method of the invention are steel plate, steel wire, glass, wood, galvanized steel, steel screen, steel wool, cotton gabardine, and a number of nylon, cotton and rayon scrim fabrics. Most advantageous of the substrates are structures fabricated of or coated with other organic materials such as polyurethane and the phenolic resins.

The cross-sectional areas of such passages or cells may also vary quite widely, the only basic limitation being the degree to which the coating material can be ground into a fine powder in order to be deposited on the interior of a structure as described above. However, it should be understood that the method of the invention could also be practiced on structures having much simpler shapes than those shown in the drawings, including even planar surfaces.

FIG. 1 shows a simple honeycomb structure, the cells of which could greatly be extended in length compared to the cross-sectional areas of the cells but basically representing a hexagonal honeycomb structure. FIG. 3 illustrates the structure of a relatively new basic material known commonly as reticulated polyurethane foam. These foams and methods of their preparation and formation are disclosed in U.S. Pat. 3,171,820. These foams are basically three-dimensional porous structures and may be considered as three-dimensional honeycombs comprised of integrally interconnecting strands forming an isotropic skeletal outline of a multitude of polyhedrons whose faces are polygonal.

As is well known, polyurethane foams can withstand higher temperatures before decomposition (about 450° F.) than most polyolefins. Polyurethane foams are generally made from a polymeric polyol resin and a polyisocyanate by reacting these components in the presence of water giving off blowing gases and/or a blowing agent activated by heat of reaction, while the polymer is reaching a more solid yet formable state. Most common foams are made from either a polyester or a polyether resin. Reticulated foams of the type mentioned above are available at Scott Paper Company, Foam Division, Eddystone, Pa.

Obviously, various methods may be employed for temporarily attaching and retaining the powdered coating material upon the structure prior to fusion or melting of such coating material over the surface of the structure. One means successfully employed has been to initially coat the structure with a binding liquid by dipping or spraying. The amount of such binding liquid is not critical, it being sufficient merely to wet the surface of the structure and retain the desired amount of powdered resin material. Water is preferably employed as the wetting or binding liquid because of its ready availability, low cost and good physical characteristics such as polarity. In ordinary use, water which is available is sufficiently impure that it contains a minute quantity of different materials which serve as binders. These binders retain the particles of coating material upon the structure after the structure is heated and the liquid is volatilized. In addition, the structure to be coated normally contains sufficient foreign matter to provide such binding agents normally as a result of the nature of their manufacture or chemical impurities in the material forming such structure.

However, it is recognized that often pure structures which have been cleaned or otherwise kept free of foreign matter may be hydrophobic. Furthermore, if pure water is applied to such structures to retain the coating powders, upon volatilization of the water by heat, no material is left as a binder. Surprisingly enough, in instances where powdered coating material is applied to an retained on such a structure by pure water and the structure is subjected to a temperature sufficient to fuse the coating material prior to jerky movement or extensive transport of the structure, very satisfactory performance has been achieved.

In some cases, however, it has been found desirable to incorporate a small amount of a binding liquid such as a liquid adhesive, for example, a water soluble latex-type adhesive, especially in those cases where the powder-coated structure is to be transferred prior to fusion. Another satisfactory adhesive is a 5% solution of Flexbond 150, a copolymer emulsion manufactured by Air Reduction Chemical and Carbide Company, New York. Wetting agents may be employed in the binding solution to lower the surface tension and the contact angle of the solution so as to increase wettability of the structure and evenness of the coating. Such agents may comprise, for example, one of the Pluronic Series of wetting agents manufactured by Wyandotte Chemical Company, Michigan, and may be used alone or in combination with the adhesives as additives to the binding solution. It will be apparent that many types of compositions or solutions could be employed which would serve both as wetting solutions and binding agents and all of these are considered to be within the scope of the invention. Some additional specific agents which have been employed with success will be presented in the subsequent examples.

As will be evident from subsequently presented ex- it is sometimes necessary to employ an adhesive which has dry tack on the surface of the porous body or basic structure. This may be required because of the reactivity of a particular thermosetting resin powder with the particular binding liquid employed and may also be desirable in some cases to provide a thinner coating on the structure than can be obtained with a liquid binding agent or adhesive. This is due to the fact that when a liquid is employed, a layer of resin powder having a thickness of several particles can be formed since the liquid is drawn up through the first adhered articles to the coated surface by capillary action providing means for attaching additional particles. In the case of a dry tack adhesive coating, the layer of resin powder can be restricted to a thickness of generally one particle since the particles must essentially contact the actual surface of the coated basic structure in order to be retained thereon. One way of obtaining an adhesive coating having dry tack is to coat with an adhesive solution or emulsion by means of the above-described method and then to allow the adhesive to dry prior to dusting with the resin powders. Many of the water soluble latex-type adhesives will operate satisfactorily in this manner.

The coating materials employed in the coating of the basic structures include a large variety of organic resins both of a thermoplastic or thermosetting type. The particle size of these materials is dictated by practical considerations of each application. Thus, it can be realized that if exceptionally large particles are attached to a structure, the resulting coating will be less even than that obtained by the use of coating materials of small particle size. It is also important that the particles be sufficiently small to penetrate into the interior of relatively thick cellular structures having deep passages. In this regard, it should be pointed out that there is a relationship between the pore size of the structure being coated and the particle size of the coating resin which will be apparent to one skilled in the art.

The particle size of the organic resin has also been found to have an effect on the thickness of each coating applied to a structure. For example, if the particle size of the resin is large, a thicker coating will result on the structure assuming that the binding liquid or adhesive means is the same in each instance. In the case of certain resins such as phenolic thermosetting resins, it is important to apply a series of thin coatings rather than one thick coating due to the deformation of water as a phenolic resin transforms from the B stage into the A stage or fully cured stage. The coating must be sufficiently thin to allow such water to evaporate from the structure into the atmosphere.

The nature of the organic resin coating materials may be quite variable. The resins useful in the practice of this invention may be either thermoplastic or thermosetting and may be members of the class selected from the three-dimensional thermosetting resins of which the phenolic resins and the epoxy resins are illustrative examples, and the non-melting aromatic polycarbonyl derivatives of which the polyamides, polyimides, polyazines, polyoxazoles, polypyrones, etc., are illustrative examples.

Other thermoplastics useful in the novel process include polyolefins made from precursors such as ethylene, propylene, 1-butene, (and isomers thereof) or mixtures thereof as is well known in the art. If these polymers possess a melt temperature below that of the decomposition temperature of polyurethane they are acceptable for present purposes. In order to obtain certain advantageous properties such as load-bearing characteristics, the melting temperatures of the coating should not exceed the heat stability of the substrate. With polyurethane foam, this temperature is about 450° F. High temperatures above 450° F. are tolerable if short exposure times of several minutes are used. In the present method, the higher temperatures are not detrimental with many other substrates as long as the decomposition temperature of the organic resin coating is not attained. However, for polyurethane, preferably the temperature should be below 450° F., and more preferably, below 400° F.

Polyolefin powders are available from various manufactures. For example, polyethylene powders of mesh sizes of from about 10 to about 120, densities of from 0.912 to 0.933 and melt indices of from 1 to 7 are available from U.S. Industrial Chemicals Company, New York, N.Y.; ethylene copolymers are available from Dow Chemical Company, Midland, Mich., and from Union Carbide Plastics Company, New York, N.Y., including their high density polyolefins such as their .950 to .970 and higher density polyolefins. Polypropylene powders or any other meltable powders made from the above-mentioned olefin polymers may be obtained from any custom-grinding facility such as Heisler Corporation, Wilmington, Del. or Liquid Nitrogen Processing Corporation, Malvern, Pa.

Other organic resin coating materials may be prepared from nylons, polyesters, chlorinated polyethers, cellulose acetate, cellulose acetate butyrate, polyvinylchloride, polyisobutylmethacrylate, mineral wax, and mixtures of additives of polymers listed above. They may also comprise any of the standard accepted commercial and industrial polymers that may be fused onto a structure at a temperature of from about 200° F. to about 500° F. and cured to a stable state, whereupon they assume and maintain rigid characteristics at even higher temperatures. For example, the phenol-aldehyde resins, commonly known as the Bakelite-type resins, are satisfactory. These resins comprise those derived from a large family of phenols including phenol itself as well as the homologues of phenol such as the cresols, the xylenols, the resorcinols, the catechol, p,p'-di-hydroxydiphenyl-2-2 propane, etc. and the reactions with aldehydes such as formaldehyde, acetaldehyde, glyoxal, acrolein, furfuraldehyde or compounds engendering aldehyde such as trioxane paraformaldehyde, hexanethylenetetramine and the like. The thermosetting epoxy resins as well as the other copolymers of epoxy resins with the phenolic resins, with the urea resins, the melamine resins, with the polyamide, with butadiene-acrylonitrile rubbers, etc. are satisfactory also and can be used in this process. Also satisfactory are the furane resins derived from furfuryl alcohol, furfuryl aldehyde or mixture of furfuraldehyde with furfuryl alcohol alone or in the presence of phenols. Some of the new high-heat resistant polymers which in their final state are infusible are particularly suitable for use in the process of this invention, such as the broad class of polybenzimidazoles of the general formula,

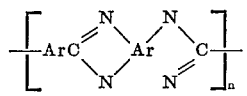

the arylene polyimides of the general formula

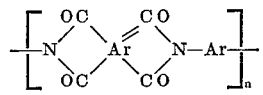

the poly Schiff bases of the general formula

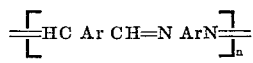

wherein Ar represents a bivalent aromatic group such as
—$C_6H_4$—, —$C_6H_4O$—$C_6H_4$—, —$C_6H_4$—$C_6H_4$—, =$C_6H_4CH_2C_6H_4$—, $C_6H_4SC_6H_4$—, —$C_{10}H_6$—
etc.

Since these coatings in their final state, are infusible and insoluble, they are necessarily applied to the reticulated structure while they are in the intermediate soluble, fusible, or soluble and fusible state, that is, uncured; thereafter cured or converted to the infusible state by any suitable means, such as by heat, catalyst or heat and catalyst.

After the structure has been wet with a binding liquid, infusible resin materials in a powdered or particulate form as described above are applied to the surface of the structure by any one of a number of known dusting techniques. The excess material may be left on or removed depending upon the thickness and uniformity of the coating desired.

The temperature to which the structure is subjected after temporary attachment of resin particles should be above the fusion temperature of the particulate coating material employed and below the decomposition temperature and fusion temperature of the material from which the basic structure is formed. It is necessary that the basic structure retain sufficient strength to support itself until the coating upon its surface becomes sufficiently rigid to increase the strength of and to support the structure. In the case of thermosetting resins, such as epoxies, this temperature should be equal to or higher than the curing temperature, that is, the temperature at which the epoxy resin passes into the B stage and irreversibly becomes directed toward a full cure. Normally, curing is accelerated by a higher temperature.

With some coating substances, other than thermosetting resins, it may be necessary to place an intermediate layer of a thermosetting resin in order to provide a structure which will withstand the higher temperatures necessary for application of a different coating composition, such as Teflon and nylon which must be applied at from about 500° F. and higher. Obviously, the temperature at which this fusion is performed depends to a large extent upon the characteristics of the material forming the basic structure. Similarly, the temperature at which the composite structure is cured and the length of time of such curing depends to a large extent upon the characteristics of the coating substance applied. In any event, a contiguous coating is formed by the fusion or melting of the coating resin particles into one another so as to form a universal and continuous layer of resin material over the entire surface of the structure.

In accordance with the method of the invention, it is also contemplated that any one or more of a large number of additives may be combined with the organic resin powder and temporarily attached to the surface of a porous structure so that when the organic resin is fused and at least, in the case of a thermosetting resin, is being cured, the additive becomes an integral part of the coating layer and attributes certain of its properties to the resulting structure. For example, it has been found that the addition of reinforcing fibers, such as fibers of glass or asbestos, imparts increased tensile strength and stiffness to the coating and similarly to the resulting composite structure.

It has also been found advantageous in certain instances to add inexpensive inert filler materials such as clays, as diluents to extend the application of the more expensive organic resins; also various pigments such as the metal oxides and copper phthalocyanines serve to color or opacify the coating. The addition of carbon black to a coating resin powder such as polyethylene has been found to promote light stability to the coating. Some of the more beneficial particulate materials employed as additives to the resin are glass fibers, asbestos, fibers, pumice, aluminum powder, glass microballoons (small hollow glass beads), phenolic microballoons, clay and silica. The particulate material may also be in the form of fibers, flakes or irregularly shaped grains depending upon the particular physical property desired in the coating and the effect to be achieved by the additive material.

The method of the present invention also contemplates the addition of a variety of particulate materials to the surface of the resulting coating structure to impart surface characteristics to the structure which are desirable in particular applications such as filtering, ion exchange, etc.

In this instance, the addition of these materials is effected after the fusion of the organic resin whereby it is melt-flowed into a coating over the surface of the structure and prior to its curing into a hard stable coating, especially in the case of a thermosetting resin. Thus, while the structure is at the fusion temperature of the organic coating material, whether it be thermosetting or thermoplastic in nature, the desired particulate material in the form of irregularly shaped grains, flakes or fibers is applied to the surface of the structure by a dusting operation as described above. The material becomes adhered to the sticky molten surface coating and is secured to the surface after hardening. In the case of humidifier pads and air filters, it can be seen that the above process is extremely important in providing a means for enhancing the wettability of the structure and increasing the surface area resulting in improved filtration efficiency. Among the materials which have been employed as additives to the surface of coated structures of the invention are feldspar, pumice, nylon flock, glass microballoons, phenolic microballoons, steel wool flock and Teflon.

The physical charatceristics of structures produced in accordance with the method of the invention depend to a large extent upon the design of the basic structure. That is, the structure illustrated by FIG. 1 would result in largely anisotropic properties being exhibited with the greatest strength being perhaps in a direction parallel to the longitudinal axis of the cells shown. It will be apparent that structures having the configuration illustrated by FIG. 3 would possess generally isotropic properties and find further uses in a variety of applications. With structures similar to that of FIG. 3, the method of the invention is especially significant in that large pieces of material can be formed by the process of the invention at a very low cost and in a large variety of easily controlled pore sizes and thicknesses. Thus, as mentioned in the previously referenced patent, the pore size and material thicknesses of polyurethane foam can be closely controlled and regulated.

The invention provides a variety of structures having open intercommunicating passages or cells comprised of composite material having an interior core of a materal forming the basic structure and an exterior layer of a coating material which may be simply cured or additionally at least partially pyrolyzed. Details of the structure can be seen from exploded sectional views of FIGS. 1 and 3 shown by FIGS. 2 and 4, respectively, which illustrate construction features which are typical of the large variety of products capable of being formed by the method of the invention.

Figure 2:
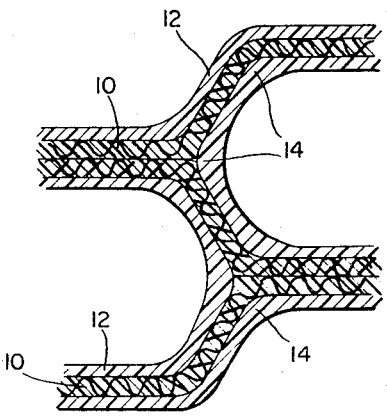
FIG. 2 is an enlarged segmented sectional view taken along line 2—2 of FIG. 1, illustrating the nature of the resulting structure.

Referring now to FIG. 1 of the drawings, there is shown in perspective a simple honeycomb structure formed in accordance with the method of the invention. The material comprising the walls of the cells forming the honeycomb structures has an interior 10 which is a woven fiber glass cloth impregnated with an organic polymer such as a phenolic resin. The layer 10 is coated on both surfaces with a layer 12 which comprises an organic resin. FIG. 2 illustrates an enlarged segmented sectional view of a honeycomb structure of FIG. 1 and illustrates more clearly the nature of the interior layer 10 and the exterior layers 12.

Another very significant feature of the invention is illustrated by FIG. 2. It wil be noticed that the regions of the coating 12 directly adjoining any corners of the structure or places where several surfaces intersect at an angle to each other forming what otherwise would be a sharp corner, have an enlarged buildup 14 of coating material 12 which tends to round off such corners and provide an outer surface to the coating 12 which is relatively smooth and free from sharp changes in direction or surface features.

As is well understood by those familiar with structural design, this feature provides that greatly increased strength will be had by the resulting structure since weaknesses inherent in sharp corners or surface details are eliminated. This effect has even more significant value when it is realized that even when materials such as resin impregnated fiber glass cloth are employed which have large variation in sheet thickness or cross-section, these variations are compensated for by the abovementioned tendency of the organic resin coating to flow evenly over and fill up any valleys or depressions which would otherwise cause weakness and present a smooth contiguous outer surface to the structure when applied in accordance with the method of the invention. This feature may also be important when products of the invention are used for filtering or various chemical applications wherein flow through the structure is desired to be uniform and with as little resistance as possible.

Figure 4:
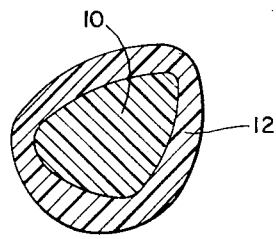
FIG. 4 is an enlarged cross-sectional view of one strand of the structure shown in FIG. 3.

FIG. 3 is a perspective view of a body of reticulated polyurethane foam which has been coated with an organic resin in accordance with the method of the invention. Thus, the structure comprises a plurality of integrally interconnecting strands and nexus forming an isotropic skeletal outline of a polyhedron whose faces are polygonal. FIG. 4 illustrates in greater detail the nature of the structure of a strand and shows a cross-sectional view of a typical strand. As can be seen, 10 designates the solid polyurethane strand and 12 illustrates the organic resin which now comprises the substance forming a coating or a contiguous layer over the structure and adding to the structural strength. The inner surface of the layer 12 may in some cases have a layer representing the reaction product of the organic resin of the layer 12 with the polyurethane 10.

In the case of a structure having the configuration shown in FIG. 3, the thickness of the coating upon each strand tends to increase slightly toward the ends of each strand adjacent to respective nexus compared with the thickness in the middle of the strand. Furthermore, there is a concentration of coated material about each nexus of the skeletal structure. This seems to be caused to a large extent by surface tension of the coating organic resin in the fused liquid state prior to its curing into a hard strengthening or protective coating. Also, in some occasional instances, some of the smaller spaces or windows of the structure defined by a plurality of interconnecting strands have a solid sheet or film of fused organic resin material across them, joining such strands. However, it should be thoroughly understood that the resulting structure will always be considerably porous and open-celled except in instances where extremely thick coatings are placed on the structure.

As previously mentioned, products obtained according to the above process are generally of the same structural form as the basic structure such as polyurethane foam, and for that reason, the final product is dependent on the physical appearance of that basic structure. Generally, in the case of polyurethane foam the structure will have of from about 5 to about 60 p.p.i. (pores per lineal inch). Of from about 5 p.p.i. to about 45 p.p.i. represents the preferred range. Foams with about 10 p.p.i. to 25 p.p.i. are the most preferred. If the process is repeated, the amount of organic resin deposit on the foam can reach 700% and above, depending on the pore size of the polyurethane foam and the mesh size of the organic resin powder. This relationship will be further explained herein.

The strength of structures of the invention depends to a large extent on the strength of each particular organic resin employed as a coating material. The amount of strength added by each resin also depends on the thickness of the resin coating applied. Some of the physical properties demonstrated and measured by certain of the structures of the invention are illustrated and described below.

The following data show the results of pressure-drop tests on an uncoated polyurethane having 10 pores per lineal inch and the same polyurethane coated with polyethylene.

TABLE I.—PRESSURE DROP TESTS ON UNCOATED AND COATED POLYURETHANE

| Sample | Coating percent based on polyurethane | Pressure drop P in inches of water at 350 ft./min. face velocity |
|---|---|---|
| Control, uncoated polyurethane, 10 p.p.i., 1″ thick | 0 | 0.080 |
| Novel structure, 10 p.p.i., 1″ thick | 150 | 0.075 |

The above results indicate that the more rounded cross-section of the coated strands offers less resistance to the flow of air than the concave triangular strands of the control sample. Generally, pressure drop increases very little with the organic resin coating; structures having up to 300% organic resin based on polyurethane will have only a slightly higher pressure drop.

TABLE II.—PRESSURE DROP CHARACTERISTICS OF DENSIFIED POLYETHYLENE-POLYURETHANE FOAM, 25 P.P.I.

| Velocity, ft./min. | Pressure drop P in inches of water at given face velocity | |
|---|---|---|
| | ½″ thick polyethylene polyurethane foam | Compressed foam ½″ densified to ⅛″ |
| 150 | .012 | .04 |
| 200 | .02 | .06 |
| 250 | .03 | .08 |
| 300 | .05 | .12 |
| 350 | .06 | .15 |
| 400 | .08 | .19 |
| 450 | .1 | .23 |
| 500 | .125 | .28 |
| 550 | .15 | .34 |
| 600 | .175 | .40 |

Other foams densified to various degrees illustrate pressure drops of various kinds, thus illustrating an aspect of this invention—pressure drop control by means of densification of the present structure.

In general, reticulated polyurethane structures and the correspondingly produced composites, consist of strands joined to nexus at spaced-apart points, forming approximately dodecahedrons, the faces of which are, in general, of pentagonal shape substantially free of any membraneous material. This configuration of foam structures is somewhat idealized and, as obtained, the dodecahedral building blocks will vary a little.

Even though the cells are randomly oriented and thus anistotropic to each other, the whole structure behaves something like an isotropic body. This property of the foam is very desirable as the pressure-drop characteristics are superior to some of the prior-art filtering pads. Thus, structures made of the novel composites are especially desirable for acid- and alkali-filtering applications because of the uniform pore size and more isotropic nature when compared to the anisotropic filtering and contacting means such as polyethylene matts.

Moreover, other characteristics of these novel composites show improved properties in the applied stress-strain relationship when compared to regular polyurethane foams. For example, the energy required to compress the novel composites is significantly higher for organic-resin-coated polyurethane than uncoated polyurethane. This property finds ready application in self-supporting filters.

Equally surprising results are obtained when the novel composites are heat-formed into various shapes desired. By heating an organic-resin-coated polyurethane reticulated structure and then holding this structure in the desired form and cooling it, a permanently set structure is obtained which will not spring back to the previous shape as polyurethane alone will do. This property of the novel structure enables production of various shape-retaining forms of the structure in hard-to-conform contours.

Further, bonding of the novel structure to various other materials is very easy because melted organic resins such as polyethylene exhibit good adhesion. For example, composite filters of varying pore sizes can be prepared by melting the polyethylene on the surface of one novel structure, and joining it to another of the present structures having less pores per lineal inch. Needless to say, various composites may be prepared in this manner. Similarly, the novel structure may be bonded to any roughened surface possessing sufficient affinity for the particular organic resin in molten condition.

If normal polyurethane foams are heat-shaped, the original structure is densified to a considerable degree. The pressure-drop characteristics of the structure suffer as a result. Elaborate steps have been taken to avoid this densification, and although some very combersome methods have offered a partial solution to the shaping problem the methods and the results have been less than desirable. For example, casting sheets of polyurethane, and then shaping and curing these before a critical time, has been one less-than-satisfactory approach. All these problems can now be avoided by heat-shaping the novel organic resin coated polyurethane composites.

It will also be apparent that relatively large cellular structures may be formed from pieces of reticulated polyurethane foam which have been coated with an organic resin and which are bonded together while the coating material is in the molten stage. This feature is of some importance where a cellular structure has extremely small cell or pore size and some limitation therefore is present in the thickness of the pieces which can be coated as one unit. In other instances, it has been found desirable to change the configuration of the cellular structure after coating and while the coating material is in the molten stage such as by compression so as to thereby densify the structure and produce a fine pored structure. Similarly, it has been found desirable and possible to form a variety of sandwich structures or laminated panels in which the coated cellular structures are disposed between two adjacent facing plates of a sheet material which are adhered to the coated foam while the coating material is in its molten stage.

Novel composites of the present invention are useful in applications such as heating plant filters, humidifier and evaporative cooler pads (in this connection surface modifiers such as glass, asbestos, feldspar and pumice may be used). For example, using polyethylene as a substrate and an adhesive to deposit on it different particulate materials or powders such as those mentioned above, and others such as alumina, carborundum, etc., novel surface-modified structures are obtained.

Alternatively, using an organic resin as a carrier for depositing particulate materials on the polyurethane substrates gives novel and different structures of the same or different abrasive materials, pigments such as $TiO_2$, and fibers. Other uses of the novel structures include scrubber pads (organic resins having incorporated abrasive materials or surface modified), carburetor air filters in general, and also, those using 'blow-by" gases, cushions, mattresses, upholstery, etc.

It has now been found that many filtering, shaping and other probelms encountered with polyurethanes have also been solved by essentially-reticulated organic resin structures produced by enveloping reticulated polymeric polyurethane structures with an organic resin envelope resembling the reticulated polyurethane structure. Other products resulting from the novel structures are densified materials having good porosity and permeability, yet possessing great structural strength. Densification of from 2 to 15 times the original volume has been achieved.

Physical properties of the novel composites are unexpectedly different from the polyurethane material. For example, the strands of the novel reticulated network are elliptical in cross-section and, for a 10 p.p.i. structure of 267% resin content, the average major and minor axis diameters are $5.1 \times 10^{-2}$ cm. and $4.7 \times 10^{-2}$ cm. respectively. On the other hand, the cross-sections of polyurethane strands resemble concavely formed equilateral triangles.

Stiffness of the novel structure related to the percent resin pickup is a straight line function. A 10 p.p.i. adipate polyester polyurethane foam coated with polyethylene (22 melt index, 50 mesh, .916 density) has the following stiffness properties.

TABLE III
Stiffness factor of polyethylene-polyurethane composite

| Resin pickup: | Stiffness factor, grams [1] |
|---|---|
| 0% | 20 |
| 100% | 90 |
| 200% | 140 |
| 300% | 200 |
| 370% | 240 |

[1] The stiffness factor is the weight required to bend a 1″ square section of polyfoam, which projects 7.5″ over the edge of a 6″ high block, to the point where it forms a 53° angle with the horizontal. All weights are placed on the upper surface of the foam and within 1″ of the unsupported end.

TABLE IV.—EFFECT OF RESIN PICKUP IN THE 190% TO 310% RANGE ON THE PHYSICAL PROPERTIES OF THE NOVEL POLYETHYLENE-POLYURETHANE COMPOSITES AT 74° F.

Polyethylene starting material is 22 melt index, 50 mesh, .916 density

| | Adipate polyester polyurethane foam 10 p.p.i. | Polyethylene on reticulated 10 p.p.i. polyurethane | | |
|---|---|---|---|---|
| | | 190% | 269% | 310% |
| Tensile strength, p.s.i. | 14.9 (30%) | 33.4 | 35.4 (29%) | 36.2 (5%) |
| Young's modulus in tension, p.s.i. | 7.2 (25%) | 117 | 125 (24%) | 167 (9%) |
| Percent elongation | 228 (28%) | 98 | 120 (31%) | 96 (12%) |
| Tear strength, lb./in. | 5.3 (28%) | 13.6 | 14.4 (24%) | 14.3 (15%) |
| Compression set at 188° F., percent | 19.2 | 29.2 | 37.3 (10%) | 27.3 (3%) |
| Compressive energy absorption at .8 in./in. strain, p.s.i. calculated from compressive stress strain curve | .17 | 6.7 | 11.7 | 17.3 |
| Shock absorbency* | 1 | 5.5 | 10 | 10+ |

*The shock absorbing capacity of the foam is measured by the height required for a 4-pound ball to fall, in order that the shock transmitted through a 1″ slab of foam is just sufficient to break 1/16″ thick glass microscope slides place beneath the foam. The ball is 3½″ O.D., the outer shell of which is a 30-gram polyethylene ball made of 3 melt index, .993 g./cc. density, 50-mesh resin. The ball is then filled to a final weight of 4 pounds with Wood's alloy. The backup for the glass plates is vinyl tile cemented to reinforced concrete. The glass slides are supplied by Arthur H. Thomas Company, Philadelphia, Pennsylvania, Code No. 7030 Special Red Label Micro Slides, and are 3″ x 1″.

TABLE V.—EFFECT OF RESIN PICKUP ON THE COMPRESSIVE STRESS-STRAIN CHARACTERISTICS OF 1″ THICK 10 P.P.I. POLYETHYLENE-POLYURETHANE COMPOSITES AT 74° F.

Polyethylene starting material is 22 melt index, 50 mesh, .916 density

| Percent resin pickup based on polyurethane | Applied stress, p.s.i. | | |
|---|---|---|---|
| | 25% defl. | 50% defl. | 75% defl. |
| 0 | .4 | .6 | 1.4 |
| 100 | 2.0 | 3.0 | 7.5 |
| 200 | 4.6 | 7.0 | 16.5 |
| 300 | 9.0 | 13.8 | 34.0 |

TABLE VI.—COMPRESSIVE STRESS-STRAIN CHARACTERISTICS OF 1″ THICK 10 P.P.I. POLYETHYLENE-POLYURETHANE COMPOSITE

Polyethylene strating material is 22 melt index, 50 mesh, .916 density

| Strain, in./in. | Applied stress, p.s.i. | | | |
|---|---|---|---|---|
| | 0% polyeth. pickup | 190% polyeth. pickup | 267% polyeth. pickup | 310% polyeth. pickup |
| .1 | .4 | 3.9 | 6.0 | 7.8 |
| .2 | .4 | 4.1 | 6.6 | 8.6 |
| .3 | .42 | 4.5 | 7.5 | 9.8 |
| .4 | .45 | 5.2 | 9.0 | 12.0 |
| .5 | .5 | 6.2 | 11.0 | 14.0 |
| .6 | .6 | 8.0 | 15.0 | 18.0 |
| .7 | .8 | 11.5 | 21.0 | 30.0 |
| .75 | | | | 44.0 |
| .8 | 1.52 | 20.0 | 45.0 | |

The tensile strength of 267% polyethylene and 10 p.p.i. polyester-polyurethane-polyethylene composite falls off approximately 2 p.s.i. for every 10-degree rise in temperature in the 74° F. to 180° F. range.

Under the load required for 25% deflection at room temperature, 10 p.p.i. polyester-polyurethane-polyethylene composites of 170%, 267% and 310% polyethylene were found to be serviceable up to approximately 210° F. The same composites also could withstand 30 minutes in boiling water while stacked to a height of 4 feet with less than 15% loss in thickness of the bottom one-inch thick section. Data given below indicate that the composites possess higher slump temperatures than polyethylene.

A 10 p.p.i. reticulated polyester-polyurethane foam with 332% coating of 3 melt index and .918 density polyethylene was compared with the same foam having 70% of the polyurethane leached out. Two-inch square by one-inch thick samples of both types of structures were compression-loaded with 5 lbs./sq. in. and inserted in an over at 200° F. for 15 minutes. The comparative results were as follows: the deflection at room temperature was 25%, and 53.5% after heating for the composite structure. For the leached-out "polyethylene" structure, the deflection at room temperature was 52% and after heating 68%. The above indicates that the composite structure is mutually reinforcing; as, at that loading level, polyurethane structure would have easily collapsed. Similarly, the higher load-bearing ability at room temperatures illustrates the cooperating nature of the two materials.

All physical properties, except as otherwise indicated, were evaluated using ASTM Standards D1564–59T.

Structures coated with thermosetting resins demonstrate even more desirable physical properties in the area of structural strength. This fact is shown by the following table which sets forth comparative results of compression tests at 77° F. of samples of reticulated polyurethane foam having 10 pores per lineal inch and coated with the designated organic resin.

TABLE VII

| | Percent resin pickup | Compressive stress, p.s.i. | Deflection, percent |
|---|---|---|---|
| Uncoated 10 p.p.i. reticulated polyurethane | 0 | 0.33 | 7 |
| High density polyethylene | 186 | 20 | 8 |
| Polypropylene (Hercoflat) | 223 | 53 | 10 |
| Chlorinated polyester (Penton) | 258 | 20 | 15 |
| Nylon (NCA-77) | 173 | 26 | 8 |
| Epoxy (ECA-1283) | 315 | 66 | 7 |

The following examples are illustrative of the method and products of the invention. They are presented solely for the purpose of example and are not intended to limit the scope of the invention in any way.

EXAMPLE 1

A 2″ x 2″ x 1″ piece of reticulated polyurethane foam having approximately 10 pores per lineal inch was immersed in an ethylene vinyl acetate (EVA) emulsion (Flexbond Adhesive) containing 5% total solids. The sample was agitated within the above emulsion so as to remove all of the air and to insure that the entire surface of the foam would be completely contacted by the emulsion. The sample was then removed from the emulsion, drained and shaken to remove any excess adhesive. Epoxy resin powder in the B stage (Corvel ECA–1283) having a particle size of 60 mesh was then applied as a coating on the surface of the foam by the following procedure. A flat tray was employed having a layer of resin powder over the bottom of it. The sample was placed in the tray and then thoroughly dusted by a flooding technique in which the pores of the foam were almost completely filled with resin powder. The sample was then removed from the tray and turned in various directions and tapped gently to remove excess resin powder.

The resin powder coated sample was then transferred to an oven and heated for 10 minutes at 428° F. to accomplish fusion and curing of the powdered resin upon the surface of the foam structure.

EXAMPLE 2

A second piece of reticulated polyurethane foam having the same physical characteristics as the foam employed in Example 1 was coated by the same procedure as employed in Example 1. In this case, however, the B stage epoxy resin powder contained 10% by weight of glass fibers mixed intimately with the resin. The glass fiber material employed was Owens-Corning-Fiberglas milled Fiberglas 701, each fiber having a diameter of about 9 microns and an average length of about 800 microns (1/32"). The epoxy-glass fiber coated sample withstood a compressive stress of 4 p.s.i. at 450° F. with negligible deflection. The coating comprised 365% of the original weight of the foam substrate.

EXAMPLE 3

A piece of polyurethane foam having the same physical characteristics as the sample employed in Example 1 was coated by means of the same procedures described in Example 1. In this instance, the adhesive emulsion was air-dried to provide the foam surface with dry tack. The resin employed in this case was a B stage phenolic resin (Union Carbide Corporation BRP–4435) having a particle size of 60 mesh. Since phenolic resins yield water upon curing from the B stage to the A stage, it was necessary to apply the resin in thin multiple coats to allow evaporation of water vapor from the resin and to inhibit bubble formation during fusion and curing of each resin coating. The resin was applied in 4 successive coats and each coat was heated for 15 minutes at 302° F. to accomplish fusion and curing. The resulting phenolic coated sample had a coating amounting to 177% of the original foam substrate weight.

EXAMPLE 4

A piece of reticulated polyurethane foam having the same physical characteristics that we employed in Example 1 was coated by the same procedure employed in Example 1. However, in this case, a B stage polyester powdered resin (General Electric Corporation, Alkanex 1003) having a particle size of 60 mesh was used. Because of the fact that a number of the ingredients contained in this resin are chemically sensitive to water, an air-dried adhesive was used as described in Example 3. Also, as described in Example 3, four multiple coats were applied in order to obtain adequate coverage and each coat was fused and cured upon the foam structure by subjecting the structure to 302° F. for 15 minutes. The final coating amounted to 266% of the weight of the original substrate.

EXAMPLE 5

A sample of 10 p.p.i. Scott Industrial Foam, 1" thick and 6" square, was coated with powdered polyethylene (Microthene 710, U.S. Industrial Chemicals Company, 50 mesh, melt index 22, .016 density) by first dampening with water, then dusting with powdered polyethylene and finally drying and fusing the sample in an oven for 10 minutes at 108° C. The polyethylene coating amounted to 229% of the polyurethane weight. In a similar manner, coatings of 190%, 269% and 310% of polyethylene were obtained.

EXAMPLE 6

Polyethylene-coated 10 p.p.i. polyester polyurethane (the ester used in a polyethylene glycol adipate) was tested for chemical resistance by varying the mesh size of polyethylene powder (22 melt index density .916). For 140 mesh size, the melt index was 5 and density .924. The results are represented in the table below.

TABLE VIII.—EFFECT OF PARTICLE SIZE ON CHEMICAL RESISTANCE

| Mesh size | Resin applied, percent of PU | Percent of polyurethane lost, 2 hrs. at 140° F. | | |
|---|---|---|---|---|
| | | 21% HCl | 70% $H_2SO_4$ | 10% NaOH |
| 20 | 406 | 100 | 100 | 39 |
| 35 | 343 | 42 | 93 | 21 |
| 50 | 281 | 28 | 49 | 5.4 |
| 80 | 210 | 2.5 | 83 | 0 |
| 140 | 180 | 41 | 72 | 2.8 |

The data indicate that despite the heavier coating of the coarse resin, maximum chemical resistance with this type of polyethylene is obtained with 50 and 80 mesh size polyethylene powders. Further tests have indicated that various melt index polyethylenes have little influence on chemical resistance. Despite the above-demonstrated type of chemical resistance to acids, these structures may still be used for other purposes such as shaping, contouring, etc.

EXAMPLE 7

Resin pickup verus chemical resistance was studied with a mixture of 25% polyethylene powder of 140 mesh and a melt index of 5 and 75% polyethylene powder of 50 mesh and a melt index of 22. The polyurethane foam coated was of the same characteristics as in Example 6. The results set out in the table below were obtained by immersing a cut specimen in the acid. Better results than shown are obtained when the cut edges are further treated to seal off the polyurethane core from the acid attack.

TABLE IX

Effect of resin pick-up on chemical resistance

Resin applied (pickup): Percent of polyurethane lost [1]
174 _____ 47
265 _____ 19
295 _____ 16
445 _____ 2.5

[1] 21% HCl, 2 hrs. at 140° F.

It has been noted that 140 mesh resin always gives a complete coating with no "dry" spots visible under microscopic examination. However, the coating is thinner than with coarses polyethylene particles. Use of a mixture of 25% of 140 mesh with 75% of a coarser mesh resin gives not only a better coverage, but also improves the resin pickup.

EXAMPLE 8

Foam of the same characteristics as indentified in Example 6 has been coated with polyethylene varying the mesh size and water pickup of polyurethane. The polyethylene has been identified in Example 7 above.

TABLE X.—EFFECT OF WATER PICK-UP AND PARTICLE SIZE ON RESIN PICK-UP

| Mesh size U.S. standard | Water pickup as percent of polyurethane | Resin pickup as percent of polyurethane |
| --- | --- | --- |
| 20 | 33 | 200 |
| 20 | 58 | 265 |
| 20 | 82 | 304 |
| 20 | 107 | 285 |
| 35 | 25 | 195 |
| 35 | 50 | 254 |
| 35 | 75 | 273 |
| 35 | 100 | 278 |
| 50 | 25 | 186 |
| 50 | 50 | 223 |
| 50 | 75 | 221 |
| 50 | 100 | 250 |
| 80 | 25 | 119 |
| 80 | 50 | 136 |
| 80 | 75 | 156 |
| 80 | 100 | 197 |
| 140 | 25 | 77 |
| 140 | 50 | 105 |
| 140 | 75 | 94 |
| 140 | 100 | 94 |

The above data indicate that resin pickup increases as particle size increases (as mesh size decreases). However, it should be noted that the use of large particle sizes such as 20 mesh gives poorer chemical resistance even at high resin pickup, while the physical properties such as compressive stress-strain is considerably better. Other foams coated according to the above techniques have been of smaller pore sizes such as about 25 p.p.i. foam, displaying a 217% polyethylene pickup. The starting material was an 80 mesh, 22 melt index, .916 density polyethylene. Similarly, a 10 p.p.i. foam was fuse-coated with 8 melt index, .950 density polyethylene giving 150% pickup.

EXAMPLE 9

An explosion-reticulated polyurethane foam produced by explosively decomposing a mixture of acetylene and oxygen produces a polyurethane foam surface having a glassy appearance. This reticulated polyurethane foam surface, when coated with polyethylene, has no coactive effect with the polyethylene. Stretching of the coated foam results in loosing of the coating, and where the coating is light, it is easily removed.

EXAMPLE 10

As an illustration of the excellent structural possibilities of porous materials made in accordance with the invention, a sandwich structure having a high strength-to-weight ratio was made by laminating a one inch thick layer of reticulated polyurethane foam coated with an epoxy resin between two square sheets of aluminum having a thickness of .016". The entire structure was cured and bonded together under a slight pressure to a controlled thickness in an oven. The weight of the resulting structure was only 0.85 pound per square foot on the basis of a thickness slightly greater than one inch. A panel was beam-loaded to 200 pounds with no noticeable deflection.

EXAMPLE 11

Three 6 inch squares of reticulated polyurethane foam coated with low density polyethylene were joined together as a laminate while they were in an oven at a temperature of 330° F. One of the squares of foam having a thickness of one inch and containing approximately 10 pores per lineal inch was disposed between the other two layers, one having a thickness of ½" and the other having a thickness of ¾", and both of these layers having approximately 20 pores per square inch. The combined sample was then removed from the oven as a unit and allowed to cool. The resulting sample was a composite laminate structure having differential compressive properties through its width.

EXAMPLE 12

A piece of reticulated polyurethane foam having approximately 10 pores per lineal inch and a thickness of one inch was coated with high density polyethylene in accordance with the method of the invention. While the polyethylene coated material was in its molten state, the coated foam sample was placed between two metal plates in an oven at 350° F. The sample was compressed from a thickness of one inch to a thickness of about ¼". The compressed sample was maintained in its compressed state and removed from the oven and cooled. Upon release of the applied pressure, the finished structure had a thickness of about ¼".

EXAMPLE 13

A piece of reticulated polyurethane foam having approximately 10 pores per lineal inch and having a size of 16" x 16" x 1" was coated with polyethylene. It was removed from the oven after coating and formed into a cylinder while the coating material was in its molten state. The cylindrical configuration was maintained until the sample cooled to room temperature. Upon the release of the forming pressure, the coated sample retained its shape.

EXAMPLE 14

An 18 inch square sheet of reticulated polyurethane foam having approximately 10 pores per lineal inch was coated with an epoxy resin. At about the same time, two aluminum sheets 18 inches square and .016 inch thick were each coated on one side with the same epoxy resin. The foam sheet was disposed between the two metal sheets having their coated faces directed toward the foam and the entire sandwich assembly was cured and bonded under slight pressure to a controlled thickness in an oven to yield a light, strong structural panel.

EXAMPLE 15

A sample of phenolic coated, fiber glass reinforced honeycomb measuring 1¼" x 2¼" x 3" and weighing 8.6462 g. was coated with powdered epoxy resin using dried adhesive, as described in Example 3. The resin fused readily when placed in a forced air oven for three minutes at 446° F. The sample was so placed in the oven that air flow was parallel to the longitudinal axes of the honeycomb cells to give a maximum rate of heat transfer. The coated sample weighed 21.4239 g. representing a 148% coating. The structure was greatly strengthened and stiffened by the coating.

EXAMPLE 16

A sample of fiber glass mat of the type used for furnace filters, measuring 6" x 3" x 1" and weighing 4.0 g. was double-coated with nylon (Corvel NCA-77-12 nylon powder, The Polymer Corp., Reading, Pa.) using the method described in Example 3. Each coat was fused at 400° F. for five minutes. Final weight was 46.2 g. representing a 1055% coating.

A similar sample was coated with epoxy resin (Corvel ECA 1283) to give a coating of 843%.

A similar sample was coated with polyester resin (Alkanex 1013, General Electric Co.) to give a coating of 1403%.

The above coatings caused bonding of cross-over points in the glass mats, greatly increasing the resilience and load bearing characteristics of the mat.

EXAMPLE 17

Samples of oil-free steel wool (No. 3 grade, American Steel Wool Mfg. Co., Long Island City, N.Y.) were coated as described in Example 16 to give coatings of 82% epoxy, 83% nylon, 112% polyester and 19% polyethylene. The coatings caused bonding of crossover points in the steel wool, greatly increasing the resilience and load bearing characteristics of the mat and protecting the metal from corrosion.

EXAMPLE 18

Samples of 10 mesh steel screen 6" square, were coated with various resins using the method described in Example 3.

| Sample | Coating | Type | Source | Cure Min. | Cure °F. | No. of coats | Percent coating |
|---|---|---|---|---|---|---|---|
| 1 | EVA copolymer | DQPA-3800 | Union Carbide | 5 | 329 | 2 | 18 |
| 2 | Polypropylene | PA-473 | Hercules | 10 | 356 | 4 | 18 |
| 3 | High density polyethylene | DMPA-7335 | Union Carbide | 5 | 356 | 4 | 22 |
| 4 | Nylon | NCA-77 | Polymer Corporation | 4 | 392 | 2 | 8 |
| 5 | Penton | Corvel | | 10 | 437 | 2 | 19 |
| 6 | Epoxy | ECA 1283 | Polymer Corporation | 10 | 437 | 3 | 20 |

Screens treated as above may be chosen to withstand attack from a wide range of strong acids, alkali, and oxidizing agents.

EXAMPLE 19

A sample of reticulated polyurethane foam having 10 pores per linear inch, measuring 2" x 2" x 1" and weighing 2.0 g. was coated with epoxy resin (ECA 1283) as described in Example 3, curing for 15 minutes at 446° F. It then weighed 6.8 g. The sample was then heated at 572° F. for two hours to pyrolyze the structure after which its weight was only 4.8 g. The structure was then triple-coated using fluorinated ethylene-propylene copolymer powder (Du Pont's "FEP Teflon" supplied by Liquid Nitrogen Processing Co., Malvern, Pa. as "Liquinite" F-160) as described in Example 3. A 137% coating was obtained.

The above structure is capable of withstanding attack by strong acids, strong alkalis and oxidizing agents at elevated temperatures and would be most useful in chemical process equipment under extremely corrosive conditions.

EXAMPLE 20

A sample of reticulated urethane foam 6" square and 1" thick and having 10 pores per linear inch was coated with polyethylene (Microthene 710, U.S. Industrial Chemicals Co.) using the method of Example 5. While still in the oven it was dusted with powdered pumice (Grade 0¾, Whitaker, Clark & Daniels, South Kearney, N.J.) on both sides and heated for an additional five minutes to assure adhesion between the coating and the pumice. The resulting composite structure was used successfully as a kitchen scrubber pad.

EXAMPLE 21

A sample of 10 pore reticulated polyurethane foam was double-coated with a mixture of 95% epoxy resin powder (ECA-1283, Polymer Corp.) and 5% flake graphite (No. 280 Graphite, Asbury Graphite Mills, Asbury, Warren County, N.J.) as described in Example 1. The final coating was 343%.

The structure resisted a compressive stress of 4 p.s.i. up to a temperature of 590° F. A similar unreinforced structure failed at 563° F.

As pointed out above, by means of an alternative method of the invention it is possible to remove the material forming the original structure being coated, depending upon its chemical composition, from the coated structure so as to form a new structure comprising only the coating material in the general form of the original structure. This resulting structure is, of course, formed from hollow members, such as strands and nexi in the case of a coated reticulated polyurethane foam structure.

In accomplishing this method and in forming these products, careful selection must be made of the solution for leaching or hydrolyzing the material of the original structure from within the coated structure and the environmental conditions of such leaching or hydrolysis in order to thoroughly accomplish removal of the material of the original structure without unduly hydrolyzing or otherwise degrading the material comprising the coating itself. The leaching or hydrolyzing solution finds access to the interior material of the original structure beneath the coating either by entering through cut sections of the coated structure which expose cross-sections of the interior material or by passing through the coating where it is permeable or where it is broken or cracked either during its formation or through subsequent processing.

Selection of solutions and environmental conditions for performing this method of the invention is within the ability of one knowledgeable in chemistry after the materials comprising the original structure and the coating are known. These materials may be selected from such a wide group of materials that elaboration of combinations is not appropriate or necessary here. However, the following description of the preparation of one such structure by the method of the invention should be helpful.

For example, in order to make an essentially polyolefin structure from a reticulated polyurethane structure coated with a polyolefin resin, the polyurethane core must be removed from the polyethylene. This step is carried out by simply soaking the foam in polyurethane hydrolyzing solution or by cutting the strands of nexi of the structure at appropriately spaced intervals according to the desired strength of the resulting product and then keeping the structure in a strong hydrolyzing solution, e.g., strong acid or alkali solution, preferably at elevated temperature at high concentration of the treating agent. This action hydrolyzes and dissolves out the polyurethane structure; therefore any hydrolyzing agent suitable for this purpose is acceptable. Acids such as sulfuric acid, hydrochloric acid or phosphoric acid are preferred. Weaker acids require an unduly long time for treatment although they may be used to effect the same desired result. Strong alkalies such as sodium hydroxide, potassium hydroxide and lithium hydroxide may be used instead of the acids.

Similarly, the weak acid salts of the above alkalies may be used for the same purpose. The same applies for the weak alkali salts of strong acids. In all instances, the hydrolysis reaction is at the basis of the polyurethane removal, although in the case of strong sulfuric acid, other unknown factors, such as oxidation, enter into consideration.

The resulting product is generally recovered in the same structural form as the polyurethane. Generally, the polyolefin structure will have from about 5 to about 60 p.p.i. (pores per lineal inch). From about 5 to about 45 p.p.i. represent the preferred range, with about 10 to 25 the most preferred range.

Instead of cutting the polyurethane-polyolefin structure for easy introduction of the hydrolyzing agent, polyolefin powder may be brought up to a temperature making it flow and expose only a portion of the strands or nexi of the polyurethane structure. By using this technique some of the surfaces of the polyurethane will be exposed to the hydrolytic action when appropriately treated. Although this structure does represent another embodiment, it is not as strong due to the tendency of the polyethylene to split into individual cells; however, this structure has considerably greater surface area and, for that reason, is desirable in special applications.

In addition to the two methods of introducing the hydrolyzing agent into the polyurethane structure, a cut structure will have exposed edges (if not subsequently treated to cover up the polyurethane). If this structure is treated for a sufficient time in an extremely strong hydrolyzing agent such as a sulfuric acid, and if the duration of treatment is not important, then the same removal of polyurethane may be achieved. This approach is generally applicable to smaller pieces. If contamination of the filtered stream is unimportant, the whole structure may be used and in time the polyolefin structure will result.

If polyolefin powder is admixed with the polyurethane-forming starting material after treating the polyolefin structure it will have a considerably smaller core. Generally, the products with hollow cores may be used as such. However, if the hollow core is undesirable, the novel structure may be treated by explosion-glazing techniques by subjecting the structure to an explosive flame front. Care should then be exercised to protect the structure from melting or burning.

The following examples represent a typical method of making the novel structures. These are to be construed in reference to the above discussion and are not intended to limit the broader scope of the invention.

EXAMPLE 22

A sample of 10 p.p.i. Scott Industrial Foam 1" thick and 6" square was coated with powdered polyethylene (Microthene 710, U.S.I. Chemical Company, 50 mesh, melt index 22, .916 density) by first dampening with water, then dusting with powdered polyethylene and finally drying and fusing the sample in an oven for 10 minutes at 180° C. The coating amounted to 229% of the polyurethane weight. (The relatively short oven time of 10 minutes was used to insure that the molten resin did not completely cover the substrate, thus making possible subsequent acid attack.) The condition of applying the powder may be varied to obtain the desired type of coating. In a similar manner polyethylene having a density of .950 was used in the process. Polypropylene powder is suitable in place of polyolefin.

EXAMPLE 23

The sample prepared in Example 1 was immersed in 21% hydrochloric acid for 5½ hours at 140° F. followed by immersion for an additional 64½ hours at ambient temperatures after which the sample was washed and dryed. As a result of this treatment, all polyurethane was converted to other products. The polyethylene coating appeared unaffected by the acid treatment. The above foam was also treated by an explosive mixture of oxygen and acetylene. A change in the properties was obtained such as melting of the strands and nexi.

EXAMPLE 24

Polyester polyurethane foam (the ester used is a polyethylene glycol adipate) previously obtained in reticulated form from Scott Paper Co., Foam Division, Eddystone, Pa. and cut to 84 x 22 x 1 inch sizes was wetted out in a dip tank, passed through a set of squeeze rolls with the pick-up of water adjusted to the 45% level based on polyurethane. Throughout the wetted foam sheet were dispersed 22 melt index, .916 density, 50 mesh polyethylene particles and the sheet heated for 15 minutes at 375° F. The process was repeated.

In a similar manner using the same foam, 3 melt index, .918 density, 35 mesh polyethylene particles were fused on the polyurethane structure. Changing the melt index from 22 to 3 requires an additional fusing time if the powder is applied in two applications.

Appropriate test specimens were cut from the foam and tested according to ASTM Standards D1564-59T, with the data set out and discussed below.

The effect of increasing the melting point of the fused polyethylene as shown in the tables below illustrates the drastic increase in the applied stress required when compared with polyurethane, low-density polyethylene-coated polyurethane and low-density polyethylene structure.

The increase demonstrates highly desirable properties are obtained in the novel structures even after about 95% of the polyurethane has been removed.

TABLE XI

[Compressive stress-strain relationship of 10 p.p.i. (pores per lineal inch) polyurethane polyester reticulated foam]

| Applied stress—p.s.i. | Strain—in./in. |
|---|---|
| .4 | .1 |
| .405 | .2 |
| .42 | .3 |
| .46 | .4 |
| .525 | .5 |
| .62 | .6 |
| .86 | .7 |
| 1.5 | .8 |

TABLE XII

[Compressive stress-strain relationship of 10 p.p.i. reticulated polyurethane polyester foam fuse-coated with 300% (based on polyurethane) 22 melt index .918 density polyethylene (no acid leaching)]

| Applied stress—p.s.i. | Strain—in./in. |
|---|---|
| 6.6 | .1 |
| 6.8 | .2 |
| 7.0 | .3 |
| 7.8 | .4 |
| 9.0 | .5 |
| 12.5 | .6 |
| 24.0 | .7 |
| 50.0 | .8 |

TABLE XIII

[Compressive stress-strain relationship of 10 p.p.i. reticulated polyurethane polyester foam fuse-coated with 331% (based on polyurethane) 3 melt index .918 density polyurethane (no acid leaching)]

| Applied stress—p.s.i. | Strain—in./in. |
|---|---|
| 9.6 | .1 |
| 12.0 | .2 |
| 13.5 | .3 |
| 15.5 | .4 |
| 19.0 | .5 |
| 26.0 | .6 |
| 40.0 | .7 |
| — | .8 |

TABLE XIV

[Compressive stress-strain relationship of 10 p.p.i. reticulated 22 melt index, .916 density polyethylene structure prepared by fusing 300% of above polyethylene on 10 p.p.i. reticulated polyurethant polyester foam and leaching out with HCl about 95% of the polyurethane]

| Applied stress—p.s.i. | Strain—in./in. |
|---|---|
| 2.1 | .1 |
| 2.8 | .2 |
| 3.0 | .3 |
| 3.6 | .4 |
| 4.6 | .5 |
| 6.8 | .6 |
| 13.0 | .7 |
| 44.0 | .8 |

TABLE XV

[Compressive stress-strain relationship of 10 p.p.i. reticulated 3 melt index, .918 density polyethylene structure prepared by fusing 331% of above polyethylene on 10 p.p.i. reticulated polyurethane polyester foam and leaching out with HCl about 95% of the polyurethane]

| Applied stress—p.s.i. | Strain—in./in. |
|---|---|
| 2.7 | .1 |
| 4.6 | .2 |
| 6.4 | .3 |
| 7.8 | .4 |
| 10.5 | .5 |
| 15.0 | .6 |
| 25.0 | .7 |
| 60.0 | .8 |

The above data indicate the higher density polyethylene structure (about 95% polyurethane removed) has excellent structural properties when compared (1) with lower-density polyethylene-coated polyurethane and (2) when compared with the lower-density polyethylene structure (95% polyethylene removed). The polyurethane foam stress-strain data show considerably less rigid structure.

As illustrated above the polyolefin structures are self-supporting reticulated structures especially suitable for acid or alkali filtering or demisting operations.

The high-denstiy polyethylenes such as densities of from about .950 and higher and polypropylenes give a more rigid and stronger structure while the lower-density polyethylene structures are weaker.

The stronger structures as characterized by polyethylene having a density of from about .935 to about .970 are preferred.

Polypropylene structures are also very suitable due to their rigidity which is generally higher than that of polyethylene. However, it must have a high-temperature stabilizer or antioxidant.

Additionally, a polyurethane structure may first be treated with a polypropylene powder, then treated to remove the polyurethane and then recoated with a polyethylene powder. However, the margin between the melting of polyethylene and the collapse of the structure is considerably narrower than with polyolefin-polyurethane and, therefore, close temperature control is important.

From the above it can be seen that the invention provides a method for preparing a large variety of new and novel structures and in a manner which allows the fabricating of structures from exotic materials having excellent physical properties in the configuration of and by the use of structures made of very inexpensive materials which have quite inferior properties. Furthermore, the invention provides a variety of new structural products which have good strength characteristics at relatively high temperatures and which can be further treated for advantageous application in numerous industrial areas. It will be apparent from the above that numerous modifications can be made in the method and products described above without departing from the spirit and scope of the invention.

What is claimed is:

1. A method for forming a composite porous structure of a thermoplastic resin in the image of a reticulated polyurethane foam framework formed by a plurality of strands integrally interconnected by thickened nexus and outlining a plurality of open polyhedral cavities, comprising the steps of wetting a body of said reticulated polyurethane foam with a binding liquid, dusting the surface of said foam with said thermoplastic resin in the form of a powder so as to substantially uniformly cover the entire surface of said foam structure with temporarily-attached, particulate thermoplastic resin powder, and subjecting said foam structure to a temperature above the fusion temperature of said thermoplastic resin and below the fusion and decomposition temperatures of said foam so as to melt-flow said thermoplastic resin into a smooth contiguous coating over the entire surface of said foam structure.

2. A method according to claim 1 wherein fibers of a different material are temporarily attached to the surface of said structure along with said particulate thermoplastic resin.

3. A method according to claim 1 wherein granular filler material is temporarily attached to the surface of said structure along with said particulate thermoplastic resin.

4. A method according to claim 1 wherein a particulate pigment is temporarily attached to the surface of said structure along with said particulate thermoplastic resin.

5. A process for coating a body of reticulated polyurethane foam having a pore density in the range from about 5 to about 60 pores per lineal inch comprising the steps of: intimately contacting said polyurethane body throughout its cross-section with water, uniformly distributing particles of polyolefin material having a mesh size in the range from about 10 to about 120 throughout the cross-section of said body and heating said body to a temperature below the decomposition temperature of said body and said polyolefin material to uniformly melt-flow said polyolefin material thereover to form a substantially continuous coating throughout said body.

6. A process as set forth in claim 5 wherein said polyolefin material is polyethylene.

7. A process as set forth in claim 5 wherein said steps of contacting, distributing and heating are sequentially repeated at least twice.

8. A method for forming a composite porous structure of a thermosetting resin in the image of a reticulated polyurethane foam framework formed by a plurality of strands integrally interconnected by thickened nexus and outlining a plurality of open polyhedral cavities, comprising the steps of wetting a body of said reticulated foam with a binding liquid, dusting the surface of said foam with said thermosetting resin in the form of a powder so as to substantially uniformly cover the entire surface of said foam structure with temporarily-attached particulate thermosetting resin, initially subjecting said foam structure to a temperature above the fusion temperature of said thermosetting resin and below the fusion and decomposition temperatures of said foam so as to melt-flow said thermosetting resin into a smooth contiguous coating over the entire surface of said foam structure, and subsequently maintaining the structure at a temperature sufficient to cure said thermosetting resin.

9. A method according to claim 8 wherein fibers of a different material are temporarily attached to the surface of said structure along with said particulate thermosetting resin.

10. A method according to claim 8 wherein granular filler material is temporarily attached to the surface of said structure along with said particulate thermosetting resin.

11. A method according to claim 8 wherein a particulate pigment is temporarily attached to the surface of said structure along with said particulate thermosetting resin.

References Cited
UNITED STATES PATENTS

| | | | |
|---|---|---|---|
| 2,603,575 | 7/1952 | Schramm | 117—60 |
| 2,910,396 | 10/1959 | Randall et al. | 161—68 |
| 2,964,424 | 12/1960 | Mast | 117—98 F |
| 3,028,251 | 4/1962 | Nagel | 117—21 |
| 3,098,759 | 7/1963 | Lincoln | 117—95 |
| 3,140,195 | 7/1964 | Nagel | 117—21 |
| 3,149,988 | 9/1964 | Penman | 117—21 |
| 3,150,024 | 9/1964 | Penman | 117—21 |
| 3,260,618 | 7/1966 | Stark | 117—102 |
| 3,285,586 | 11/1966 | Powers | 261—92 |
| 3,306,967 | 2/1967 | Turkewitsch | 264—321 |
| 3,353,994 | 11/1967 | Welsh et al. | 117—16 |
| 3,458,338 | 7/1969 | Adams | 117—33 |
| 3,497,256 | 2/1970 | Rosenblatt | 264—126 |
| 3,511,689 | 5/1970 | Winkler | 117—21 |
| 3,513,012 | 5/1970 | Point | 117—33 |

WILLIAM D. MARTIN, Primary Examiner

R. M. SPEER, Assistant Examiner

U.S. Cl. X.R.

117—16, 26, 33, 98, 99, 126 GR, 140; 156—283